United States Patent
Olson et al.

(10) Patent No.: US 10,565,501 B1
(45) Date of Patent: Feb. 18, 2020

(54) BLOCK DEVICE MODELING

(71) Applicant: Amazon Technologies, Inc., Reno, NV (US)

(72) Inventors: Marc Stephen Olson, Bellevue, WA (US); James Michael Thompson, Seattle, WA (US); Benjamin Arthur Hawks, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 277 days.

(21) Appl. No.: 13/866,789

(22) Filed: Apr. 19, 2013

(51) Int. Cl.
*G06N 5/02* (2006.01)

(52) U.S. Cl.
CPC ................... *G06N 5/02* (2013.01)

(58) Field of Classification Search
CPC ...... G06N 99/005; G06N 5/025; G06N 7/005; G06K 9/6256; G06K 9/6269
USPC .......................................................... 706/12
See application file for complete search history.

(56) References Cited

U.S. PATENT DOCUMENTS

| | | | | |
|---|---|---|---|---|
| 6,374,336 B1 * | 4/2002 | Peters | ................. | G06F 11/1076 711/167 |
| 6,594,261 B1 * | 7/2003 | Boura | ................. | H04L 41/0654 370/217 |
| 6,604,178 B1 * | 8/2003 | Hall | ...................... | G06F 3/0601 360/901 |
| 7,363,453 B1 * | 4/2008 | Arnan | .................... | G06F 3/061 707/999.002 |
| 7,694,166 B1 * | 4/2010 | Suggs | ................. | G06F 11/2025 709/211 |
| 7,840,777 B2 * | 11/2010 | Mykland | ............... | G06F 9/3001 712/15 |
| 8,184,540 B1 * | 5/2012 | Perla | ..................... | H04L 47/568 370/235 |
| 8,407,219 B1 * | 3/2013 | Das | ................... | G06F 16/90335 707/732 |
| 8,429,307 B1 * | 4/2013 | Faibish | ................. | G06F 3/0605 710/1 |
| 8,606,958 B1 * | 12/2013 | Evans | ..................... | A63F 13/12 709/203 |
| 8,620,921 B1 * | 12/2013 | Susarla | ............... | G06F 11/3409 707/738 |
| 8,751,725 B1 * | 6/2014 | Gangadharan | ...... | G06F 12/0638 711/100 |
| 9,432,298 B1 * | 8/2016 | Smith | ................. | H04L 49/9057 |
| 9,830,256 B1 * | 11/2017 | Olson | ..................... | G06F 12/00 |
| 2004/0126782 A1 * | 7/2004 | Holden | ................ | G06K 9/6226 435/6.14 |
| 2004/0225631 A1 * | 11/2004 | Elnaffar | ................ | G06F 9/5083 |

(Continued)

OTHER PUBLICATIONS

Wu et al.—Improving SSD Lifetime via Exploiting Content Locality—2012—http://dl.acm.org/citation.cfm?id=2168862.*
U.S. Appl. No. 13/866,825, filed Apr. 19, 2013, Olson et al.

*Primary Examiner* — Scott A. Waldron
*Assistant Examiner* — Viker A Lamardo
(74) *Attorney, Agent, or Firm* — BakerHostetler

(57) ABSTRACT

Techniques are described for formally expressing whether sequences of operations performed on block storage devices are sequential or random. In embodiments, determinations of whether these sequences of operations are sequential or random may be used to predict latencies involved with running particular workloads, and to predict representative workloads for particular latencies.

21 Claims, 9 Drawing Sheets

(56) References Cited

U.S. PATENT DOCUMENTS

| | | | | |
|---|---|---|---|---|
| 2006/0069863 A1* | 3/2006 | Palmer | ............... | G06F 3/0605 |
| | | | | 711/114 |
| 2007/0027636 A1* | 2/2007 | Rabinowitz | ............ | G06Q 50/22 |
| | | | | 702/20 |
| 2008/0154816 A1* | 6/2008 | Xiao | ............... | G06N 3/02 |
| | | | | 706/15 |
| 2008/0177951 A1* | 7/2008 | Bartley | ............... | G06F 13/161 |
| | | | | 711/119 |
| 2009/0281783 A1* | 11/2009 | Bitar | ............... | G06F 11/3457 |
| | | | | 703/21 |
| 2010/0030809 A1* | 2/2010 | Nath | ............... | G11C 11/5621 |
| | | | | 707/824 |
| 2011/0194347 A1* | 8/2011 | Chae | ............... | G11C 11/5628 |
| | | | | 365/185.03 |
| 2011/0276977 A1* | 11/2011 | van Velzen | ............ | G06F 9/5038 |
| | | | | 718/104 |
| 2011/0313548 A1* | 12/2011 | Taylor | ............... | G06F 16/9535 |
| | | | | 700/47 |
| 2012/0047287 A1* | 2/2012 | Chiu | ............... | G06F 3/0605 |
| | | | | 710/8 |
| 2013/0205005 A1* | 8/2013 | Ashok | ............... | G06F 15/17 |
| | | | | 709/224 |
| 2014/0244643 A1* | 8/2014 | Basak | ............... | G06F 11/3414 |
| | | | | 707/737 |
| 2014/0368340 A1* | 12/2014 | Jerzak | ............... | G05B 19/048 |
| | | | | 340/540 |

* cited by examiner

BLOCK DEVICE MODELING

CROSS REFERENCE

This application is subject matter related to U.S. patent application Ser. No. 15/799,246 filed Apr. 19, 2013 and entitled "Block Device Workload Analysis," which is herein incorporated by reference in its entirety.

BACKGROUND

Persistent storage (such as found in a hard disk, flash memory, or a magnetic tape) may be implemented using block storage. In block storage, the storage space is divided into blocks—portions of the storage space that are a set number of bytes long (the block size). When an operating system attempts to read to or write from a storage device using block storage, the operating system may identify the blocks to be read to or written from by specifying a starting point (such as by specifying a distance from the logical beginning of the disk) and a length of data to be read or written (e.g., 16k bytes).

DETAILED DESCRIPTION

Figure 1:
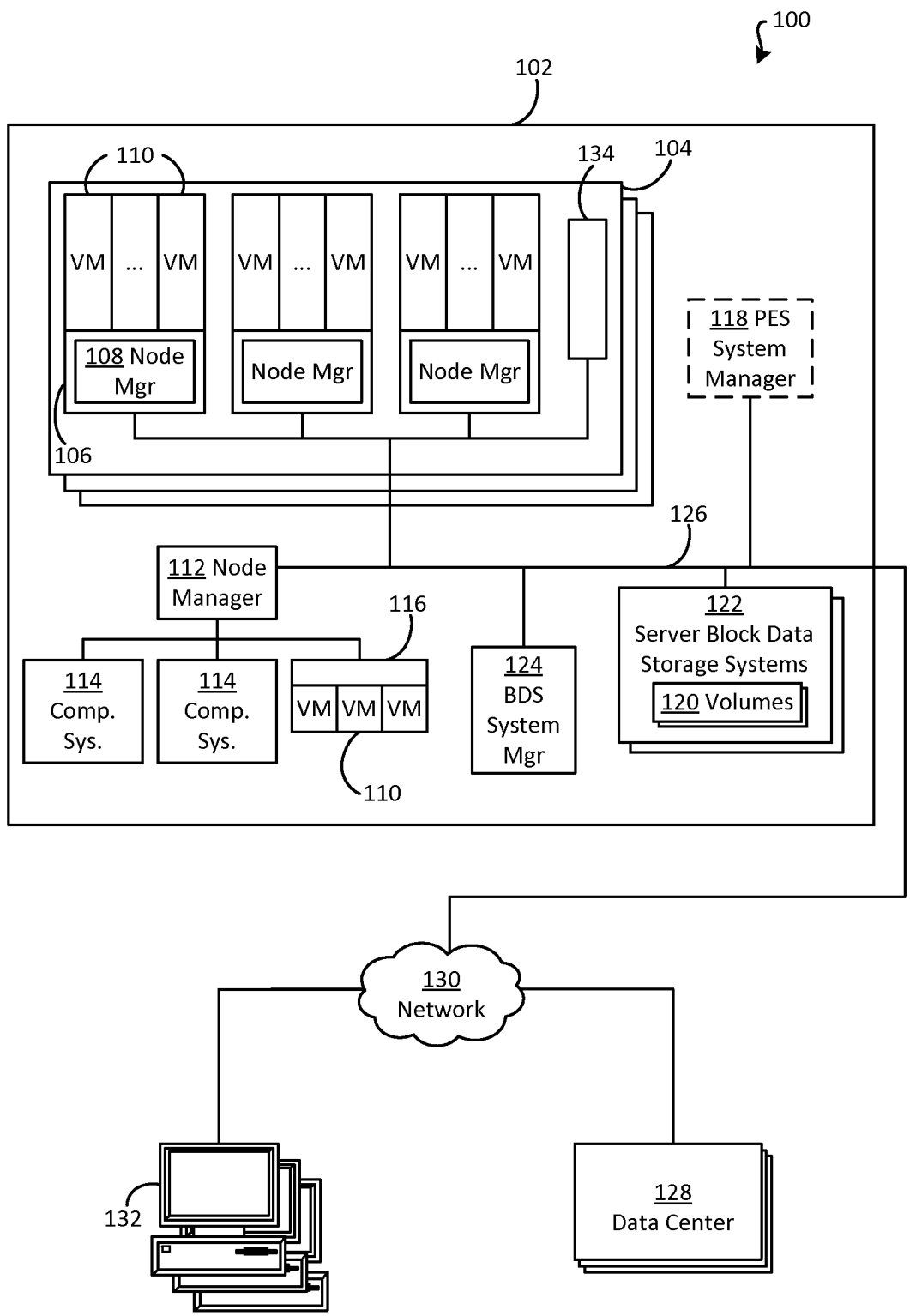
FIG. 1 depicts an example network services platform that provides a block data storage service.

Read and write operations made to block storage may affect system performance based on whether they are sequential or random. That is, there are two types of read operations—a sequential read and a random read—and there are two types of write operations—a sequential write and a random write. Furthermore, a read or write is not considered to be sequential or random in the abstract—a read or write is considered to be sequential or random based on its relationship to the operation that comes before or after it. For example, a sequential operation may be one that has a location on a block storage device within a threshold distance from the operation that immediately precedes it, and a random operation may be an operation that has a location on a block storage device greater than the threshold distance. In other words, a series of reads or writes may be considered to be sequential or random, rather than any single read or write. Where a read or write is described as being sequential or random, that may be considered to mean that it is a read or write that exists within a sequence of sequential or random operations.

Notwithstanding the foregoing, read and write operations are often conceptually thought of as being random or sequential, but this conceptualization is generally an intuitive determination that lacks the present disclosure's use of formal parameters to determine whether operations are random or sequential. The pre-existing concept of operations being random is generally based on a person's intuitive understanding. For instance, the pre-existing concept of operations being random or sequential is not based on a formal examination of the delta in one or more aspects between adjacent operations, or the latency between when these operations are carried out. Two operations may be considered to be adjacent where one immediately follows the other in a sequence of operations, without the presence of an intervening operation.

Although, the notion of random and sequential operations are somewhat conceptual, a more rigorous classification could be used to improve a given system's operation. Read or write operations made to block storage may affect system performance differently based on whether a series of operation is random or sequential. Random operations, for example, operations on a hard disk drive in which the hard disk head must be moved several tracks, or where there is a large space within a track between two operations, may take more time than it takes to perform a sequential operation. In a sequential operation, for example, in a hard disk, a series of operations occur over a roughly contiguous area so that the hard disk head stays on the same track between operations. Given these considerations, it may be advantageous to be able to determine the rate of sequential reads or writes relative to random reads or writes.

There may also be systems that support multiple entities (an entity may be associated with a particular user customer, or may be, e.g., an account for a corporation that has multiple distinct users or user accounts associated with it), and it may be beneficial to be able to determine the rate of sequential reads or writes relative to random reads or writes for a an entity. It may be that what is referred to as an entity is a customer account that multiple users are authorized to access (e.g., the customer account may be for a corporation, and the multiple users may be employees of the corporation). In this scenario, it may be beneficial to be able to determine the rate of sequential reads or writes relative to random reads or writes for a given authorized user for a customer account. This information may be used, for example, to place an entity's volumes among a plurality of block storage devices. In that way, prior or historical information about an entity's operations (and their associated latency, for example) may be used to place or locate a customer's volumes based at least in part on the predicted latency associated with performing operations on these volumes (where the predicted latency is determined based on the observed historical latency). These entities may, for example, run virtual machine (VM) instances in a datacenter. They may form virtual private networks to connect these VM instances. They may also store data in the datacenter. Entities may have a variety of needs, some of which are computationally intensive, and some of which are data storage- and retrieval-intensive.

In a system that supports block storage for multiple customers (such as environment 100 of FIG. 1), historical information about random and sequential operations may be used to make decisions about the system to improve one or more characteristics of the block storage in one or more ways (e.g., placement of customer volumes within a plurality of block storage devices). For example, placement decisions for a volume may be made based on its expected workload, in terms of sequential operations and random operations. It may be determined that more expected workload associated with sequential operations may be placed on a block storage device than the expected workload associated with random operations, and this determination may be used to determine placement of a customer's volume. These sequential or random operations may be expressed in terms of deltas (which may identify a logical or physical distance between an endpoint of one operation and a start point of another operation), so more operations associated with deltas with small values (generally, sequential operations) may be placed on (or assigned to or performed on) a block storage device than operations associated with deltas with large values (generally, random operations). Additionally information about the frequency of either random and sequential operations of a first entity may be influence the placement of a volume for a second entity. As one example, this could be because the entities have certain characteristics. A characteristic may be a volume size, physical location of the entity or the location of compute resources, (e.g., the compute resources of a given data center), the number or reads, the number of writes, the percentage of reads or writes that are sequential, the percentage of reads or writes are random, and the like. In embodiments, information about one customer may be used to place a second customer's volumes because there is not yet sufficient information about what type of operations this second customer is likely to use in order to base a placement determination on the second customer's operations alone—a predetermined number of deltas for the second customer have not yet been measured.

As used herein, and described in further detail below, two adjacent operations may be considered to be sequential even though there is some number of un-accessed blocks between the operations. For instance, two reads may involve one read of 64k bytes, then skip the next 4k, and then involve a second read of another 64k bytes. These read operations may not be strictly sequential (in the conceptual sense) because those 4k bytes are skipped and not read. However, they may be determined to be sequential operations as opposed to random because they certain attributes.

The determination of whether a particular customer's operations are random or sequential (the historical operations that may be used in placement determinations for volumes upon which future operations may be made) may be made with more granularity than a binary determination of a particular operation being (a) random or (b) sequential. That is, a particular customer's operations may be considered to have a degree of randomness (and a corresponding degree of sequentiality). For example, a customer's operations may be considered to be 40% random (and, thus, 60% sequential—the rate of randomness and sequentiality summing to 100%).

The paragraphs that follow describe example systems in which block storage may be implemented, aspects of block storage devices used in determining whether operations on those block storage devices are sequential or random and operational procedures that may be implemented to effectuate aspects of the disclosure.

FIG. 1 depicts an example network services platform that provides a block data storage service. This network services platform may use block storage devices to store data, such as the block storage device 300 of FIG. 3, and may implement the operating procedures of FIGS. 5 and 7-9.

Environment 100 of FIG. 1 provides multiple computing systems that are operable to access non-local block data storage, which, in one embodiment is block storage under the control of a block data storage service. Environment 100 also provides multiple computing systems that are operable to execute various programs, applications and/or services, which in one embodiment comprises one or more computing services under the control of one or more program execution services. In particular, in this example, a program execution service manages the execution of programs on various host computing systems located within a data center 102, and a block data storage service uses multiple other block data storage systems at the data center to provide reliable non-local block data storage to those executing programs. Multiple remote archival storage systems external to the data center may also be used to store additional copies of at least some portions of at least some block data storage volumes.

In this example platform of FIG. 1, a data center 102 includes a number of racks, each rack including a number of host computing systems 106, as well as an optional rack support computing system 134 in this example embodiment. The host computing systems 106 on the illustrated rack 104 each host one or more virtual machines 110 in this example, as well as a distinct node manager module 108 associated with the virtual machines on that host computing system to manage those virtual machines.

One or more other host computing systems 116 may also each host one or more virtual machines 110 in this example. Each virtual machine 110 may act as an independent computing node for executing one or more program copies (not shown) for a user (not shown), such as a customer of the program execution service. In addition, this example data center 102 further includes additional host computing systems 114 that do not include distinct virtual machines, but may nonetheless each act as a computing node for one or more programs (not shown) being executed for a user. As used herein, a computing node may be implemented on a wide variety of computing environments, such as commodity-hardware computers, virtual machines, computing clusters and computing appliances. Any of these computing environments may, for convenience, be described as computing nodes.

In this example platform of FIG. 1, a node manager module 112 executing on a computing system (not shown) distinct from the host computing systems 114 and 116 is associated with those host computing systems to manage the computing nodes provided by those host computing systems, such as in a manner similar to the node manager modules 108 for the host computing systems 106. The rack support computing system 134 may provide various utility services for other computing systems local to its rack (e.g., long-term program storage, metering and other monitoring of program execution and/or of block data storage access performed by other computing systems local to the rack, etc.), as well as possibly to other computing systems located in the data center. Each computing system may also have one or more locally attached storage devices (not shown), such as to store local copies of programs and/or data created by or otherwise used by the executing programs, as well as various other components.

In this example platform of FIG. 1, an optional computing system is also illustrated and executes a PES (programmable execution system) system manager module 118 for the program execution service to assist in managing the execution of programs on the virtual machine instances provided by the host computing systems located within data center 102 (or optionally on computing systems located in one or more other data centers 128, or other remote computing systems 132 external to data center 102). As discussed in greater detail elsewhere, a PES system manager module may provide a variety of services in addition to managing execution of programs, including the management of user accounts (e.g., creation, deletion, billing, etc.), the registration, storage and distribution of programs to be executed, the collection and processing of performance and auditing data related to the execution of programs and the obtaining of payment from customers or other users for the execution of programs, etc. In some embodiments, the PES system manager module 118 may coordinate with the node manager modules 108 and 112 to manage program execution on computing nodes associated with the node manager modules 108 and 112. In other embodiments, the PES system manager module may manage the execution of programs without the assistance of the node manager modules 108 and 112.

In this example platform of FIG. 1, the data center 102 also includes a computing system that executes a Block Data Storage ("BDS") system manager module 124 for the block data storage service to assist in managing the availability of block data storage to programs executing on computing nodes provided by the host computing systems located within the data center (or optionally on computing systems located in one or more other data centers 128, or other remote computing systems 132 external to the data center). BDS system manager module 124 is depicted here as a separate component for ease of understanding and illustration. It may be appreciated, as with the other components, that there are embodiments where the various nodes communicate directly with system block data storage systems 122. In particular, in this example, the data center 102 includes a pool of multiple block data storage systems 122, which each have local block storage for use in storing one or more volume copies 120. Access to the volume copies 120 is provided over the internal network(s) 126 to programs executing on virtual machine 110, host computing systems 105, and host computing systems 114.

As discussed in greater detail in the paragraphs herein below, a BDS system manager module 124 may provide a variety of services related to providing block data storage functionality, including, for example: the management of accounts (e.g., creation, deletion, billing, etc.), the creation, use and deletion of block data storage volumes and snapshot copies of those volumes, the collection and processing of performance and auditing data related to the use of block data storage volumes and snapshot copies of those volumes and the obtaining of payment from entities for the use of block data storage volumes and snapshot copies of those volumes and so on. In some embodiments, the BDS system manager module 124 may coordinate with the node manager modules 108 to manage use of volumes by programs executing on associated computing nodes, while in other embodiments the node manager modules 108 may not be used to manage such volume use. In addition, in other embodiments, one or more BDS system manager modules 124 may be structured in other manners, such as to have multiple instances of the BDS system manager executing in a single data center (e.g., to share the management of block data storage by programs executing on the computing nodes provided by the host computing systems located within the data center), and/or such as to have at least some of the functionality of a BDS system manager module being provided in a distributed manner by software executing on some or all of the block data storage systems 122 (e.g., in a peer-to-peer manner, without any separate centralized BDS system manager module 124).

In this example platform of FIG. 1, the various host computing systems, block data storage systems, and computing systems are interconnected via one or more internal networks 126 of the data center, which may include various networking devices (e.g., routers, switches, gateways, etc.) that are not shown. In addition, the internal networks 126 are connected to an external network 130 (e.g., the Internet or other public network), and the data center 102 may further include one or more other devices (not shown) at a connection point between the data center and an external network (e.g., network proxies, load balancers, network address translation devices, etc.). The data center 102 is connected via the external network 130 to one or more other data centers 128 that each may include some or all of the computing systems and storage systems illustrated with respect to data center 102, as well as other remote computing systems 132 external to the data center. The other remote computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or alternatively on one or more computing systems of the data center, as described in greater detail elsewhere. Furthermore, while not illustrated here, in at least some embodiments, at least some of the block data storage systems 122 may further be connected with one or more other networks or other connection mediums, such as a high-bandwidth connection over which the block data storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, block data storage systems and other devices may be much larger than what is depicted in FIG. 1. For example, as one illustrative embodiment, there may be approximately 4,000 computing systems per data center, with at least some of those computing systems being host computing systems that may each host fifteen virtual machines, and/or with some of those computing systems being block data storage systems that may each store several volume copies. If each hosted virtual machine executes one program, then such a data center may execute as many as sixty thousand program copies at one time. Furthermore, hundreds or thousands (or more) of volumes may be stored on the block data storage systems, depending on the number of server storage systems, size of the volumes, and number of mirror copies per volume. It will be appreciated that in other embodiments, other numbers of computing systems, programs and volumes may be used.

Figure 2:
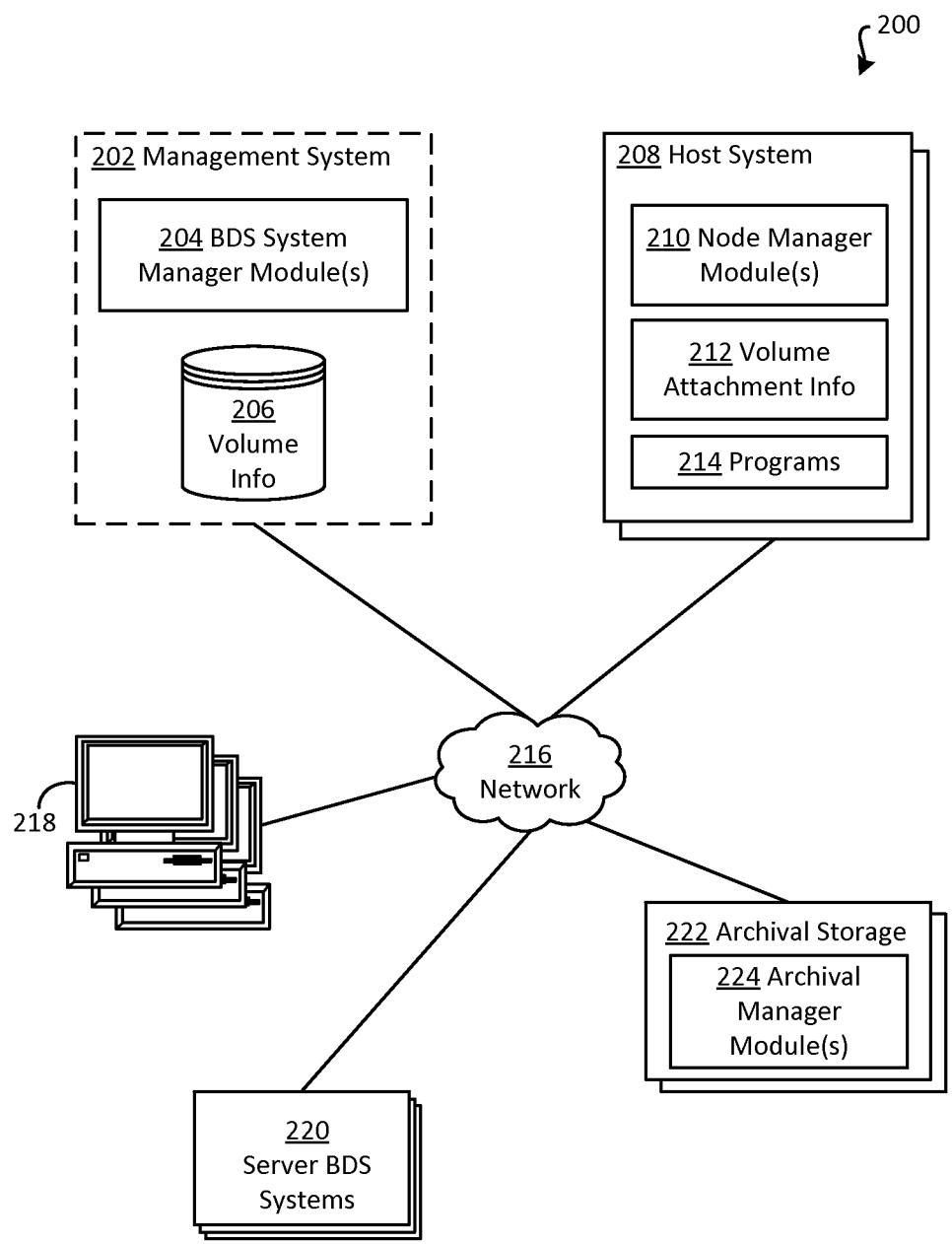
FIG. 2 depicts an example system that provides a network-accessible block-storage service.

FIG. 2 depicts an example a system that provides a network-accessible block-storage service. This system that provides a network-accessible block-storage service may use block storage devices to store data, such as the block storage device 300 of FIG. 3, and may implement the operating procedures of FIGS. 5 and 7-9. In embodiments, and as described in more detail below, components of FIG. 2 may be implemented in components of FIG. 1. For example, management system 202 and host computing systems 208 of FIG. 2 may be implemented in data center 102 of FIG. 1.

FIG. 2 depicts environment 200 which includes computing systems suitable for managing the provision and use of non-local block data storage functionality to entities that can be used in accordance with various embodiments. In this example, a management system 202, such as one or more server computers including one or more externally-facing interfaces (not shown), is programmed to execute an embodiment of at least one BDS system manager module 204 to manage provisioning of block data storage functionality to programs executing on host computing systems 208 and/or on at least some other computing systems 218, such as to block data storage volumes (not shown) provided by the block data storage systems 220. Each of the host computing systems 208 in this example also executes an embodiment of a Node Manager module 210 to manage access of programs 214 executing on the host computing system at least to some of the block data storage volumes, such as in a coordinated manner with the BDS system manager module 204 over a network 216 (e.g., an internal network of a data center, not shown, that includes the computing systems 202, 208, 220, and optionally at least some of the other computing systems 218). In other embodiments, some or all of the Node Manager modules 210 may instead manage one or more other computing systems (e.g., the other computing systems 218).

In addition, multiple block data storage systems 220 are illustrated that each can store at least some of the block data storage volumes (not shown) used by the executing programs 214, with access to those volumes also provided over the network 216 in this example. One or more of the block data storage systems 220 may also each store a server software component (not shown) that manages operation of one or more of the block data storage systems, as well as various information (not shown) about the data that is stored by the block data storage systems. Thus, in embodiments, the management system 202 of FIG. 2 may correspond to the BDS system manager module 124 of FIG. 1, one or more of the Node Manager modules 108 and 112 of FIG. 1 may correspond to the node manager modules 210 of FIG. 2, and/or one or more of the block data storage systems 220 of FIG. 2 may correspond to block data storage systems 122 of FIG. 1. In addition, in this example embodiment, multiple archival storage systems 222 are illustrated, which may store data, encoded data, replicated data, snapshot copies and/or other copies of at least portions of at least some block data storage volumes stored on the block data storage systems 220. The archival storage systems 222 may also interact with some or all of the computing systems 202, 208, and 220, and in embodiments may be remote archival storage systems (e.g., of a remote storage service, not shown) that interact with the computing systems over one or more other external networks (not shown).

The other computing systems 218 may further include other proximate or remote computing systems of various types in at least some embodiments, including computing systems via which customers or other users of the block data storage service interact with the management and/or host systems. Furthermore, one or more of the other computing systems 218 may further execute a PES system manager module to coordinate execution of programs on the host computing systems 208 and/or other computing systems 218, or the management system 202 or one of the other illustrated computing systems may instead execute such a PES system manager module, although a PES system manager module is not illustrated in this example.

In the illustrated embodiment, a node manager module 210 is executing in memory in order to manage one or more other programs 214 executing in memory on the computing system, such as on behalf of customers of the program execution service and/or block data storage service. In some embodiments, some or all of the computing systems 208, which may be physical host computers or computing devices that execute a host operating system, may host multiple instances—where, in embodiments, an instance is a virtual machine instance supported by a hypervisor, or an instance running on bare metal—where there is no hypervisor used to support execution of the instance. Where computing systems 208 host instances, each of the executing programs 214 may be an entire instance (e.g., with an operating system and one or more application programs) executing on a distinct hosted computing node. The node manager module 210 may similarly be executing on another instance, such as a privileged hypervisor that manages the other hosted instances. In other embodiments, the executing instances of programs 214 and the node manager module 210 may execute as distinct processes on a single operating system (not shown) executed on a single computing system of host computing systems 208.

The archival storage system 222 is operable to execute at least one archival manager module 224 in order to manage operation of one or more of the archival storage systems, such as on behalf of customers of the block data storage service and/or of a distinct storage service that provides the archival storage systems. In other embodiments, at least one archival manager module 224 may instead be executing on another computing system, such as one of the other computing systems 218 or on the management system 202 in conjunction with the BDS system manager module 204. In addition, while not illustrated here, in some embodiments various information about the data that is stored by the archival storage systems 222 may be maintained in storage for the archival storage systems or elsewhere.

The BDS system manager module 204 and node manager modules 210 may take various actions to manage the provisioning and/or use of reliable block data storage functionality to entities (e.g., executing programs), as described in greater detail elsewhere. In this example, the BDS system manager module 204 may maintain a database 206 that includes information about volumes stored on the block data storage systems 220 and/or on the archival storage systems 222 (e.g., for use in managing the volumes), and may further store various other information (not shown) about other aspects of the block data storage service. In other embodiments, information about volumes may be stored in other manners, such as in a distributed manner by node manager modules 210 on their computing systems and/or by other computing systems. In addition, in this example, each node manager module 210 on a host computing system 208 may store information 212 about the current volumes attached to the host computing system and used by the executing programs 214 on the host computing system, such as to coordinate interactions with the block data storage systems 220 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

An environment such as that illustrated with respect to FIGS. 1-2 can be used to provide and manage compute resources shared among various entities, such as customers of datacenter 102. In one embodiment, a virtualized storage system can be provided using a number of data servers, each having a number of storage devices (e.g., storage disks) attached thereto. The storage system can expose the storage to the customers as a web service, for example. Customers then can submit web service requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a web service call into an appropriate API of a web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount allows them to specify the amount of storage to be allocated, such as a value between 1 gigabyte (GB) and 1 terabyte (TB), in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can perform various functionality, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In embodiments, the customer may then attach a new instance or perform any of a number of other such activities. Since the data volume will fail independently of the instances in some embodiments, the customer can attach a volume to a new instance if a currently associated instance fails.

In embodiments, a customer requesting a data volume is not able to select or request a particular type of volume, or a particular type of performance. A customer is typically granted an amount of storage, and the performance follows a "best effort" type of approach, wherein customer requests are performed based on the capability, load and other such factors of the system at the time of the request. Each customer is typically charged the same amount per unit measure, such as the same dollar amount per gigabyte of storage per month, as well as the same amount per number of I/O (input/output) requests per month, charged in an amount such as in increments of millions of requests per month.

Figure 3:
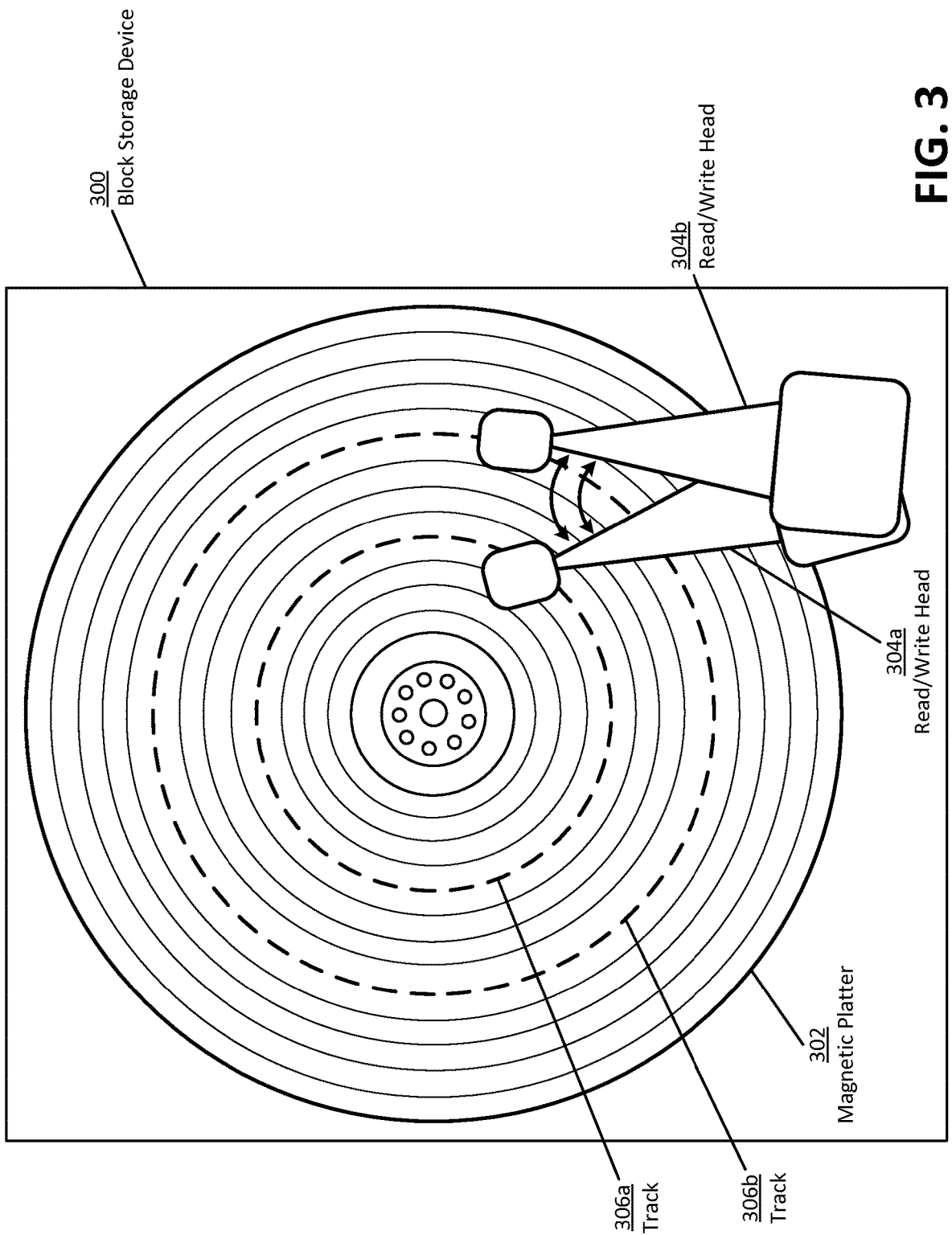
FIG. 3 depicts an example block storage device in which embodiments may be implemented.

FIG. 3 depicts aspects of an example block storage device 300 in which embodiments may be implemented. Block storage device 300 may be used to implement embodiments of FIGS. 1 and 2. For example, block storage device 300 may be implemented as part of block data storage system 122 of FIG. 1, or as part of block data storage system 220 of FIG. 2.

FIG. 3 depicts a block storage device 300 in the form of a hard disk, though it may be appreciated that the principles described here may be applied to other types of block storage devices, such as optical media, a magnetic tape device or flash storage. For example, while latency may be introduced to hard disk storage where the hard disk head moves between tracks, a similar latency may be introduced to magnetic tape storage where the tape is moved forward or backward.

As depicted, block storage device 300 has a magnetic platter 302. Magnetic platter 302 may be used to store data in one or more tracks (depicted as tracks 306a and 306b). Data may be read from and written to magnetic platter 302 via read/write head (depicted in two different positions as read/write heads 304a and 304b). Magnetic platter 302 spins, allowing the data in a track to pass under a read/write head. Example rates at which magnetic platter 302 may spin are 4,200 revolutions per minute (RPM), 5,400 RPM, 7,200 RPM, 10,000 RPM, and 15,000 RPM. Additionally, the read/write head may move (depicted here in two different positions as read/write head 304a and read/write head 304b), allowing the read/write head to pass over each track on magnetic platter 302, so that the read/write head may read data from each track on magnetic platter 302. For example, as positioned in 304a, read/write head is positioned to read data from and write data to track 306a. Additionally, as positioned in 304b, read/write head is positioned to read data from and write data to track 306b.

Given these mechanical aspects of block storage device 300, there are latencies involved with moving the various parts to perform operation on a particular block. For example, the read/write head may be positioned over the correct track, but the track may not be in the proper position and magnetic platter 302 must be rotated until the proper block of the track is under the read/write head. The time involved in rotating magnetic platter 302 so that the proper block is under the read/write head is a latency involved with reading data from and storing data to block storage device 300.

Another example with latency involves moving the read/write head itself. The read/write head may not be positioned over the correct track, meaning that the read/write head must be moved until it is positioned over the correct track. The time involved in moving the read/write head so that the proper track is under the read/write head is another latency involved with reading data from and writing data to block storage device 300.

Generally, a sequential read or write operation may be performed more quickly on block storage device 300 than a random read or write operation, because performing the sequential operation involves moving these mechanical parts less than is involved with performing a corresponding random operation. As described herein, this difference in latencies becomes a consideration in classifying read and write operations as being sequential or random because the latencies affect system performance. For instance, fewer high-latency operations may be performed in a certain time period than the number of low-latency operations that may be performed in that same time period. The latency involved with moving a read/write head or spinning a platter at the start of a series of sequential operations may be considered to be amortized over the series of sequential operations. Thus, the latency cost of each of these sequential operations may generally be lower than the latency cost of a corresponding series of random operations, which may each have a separate latency involved with moving the read/write head or spinning a platter.

Figure 4:
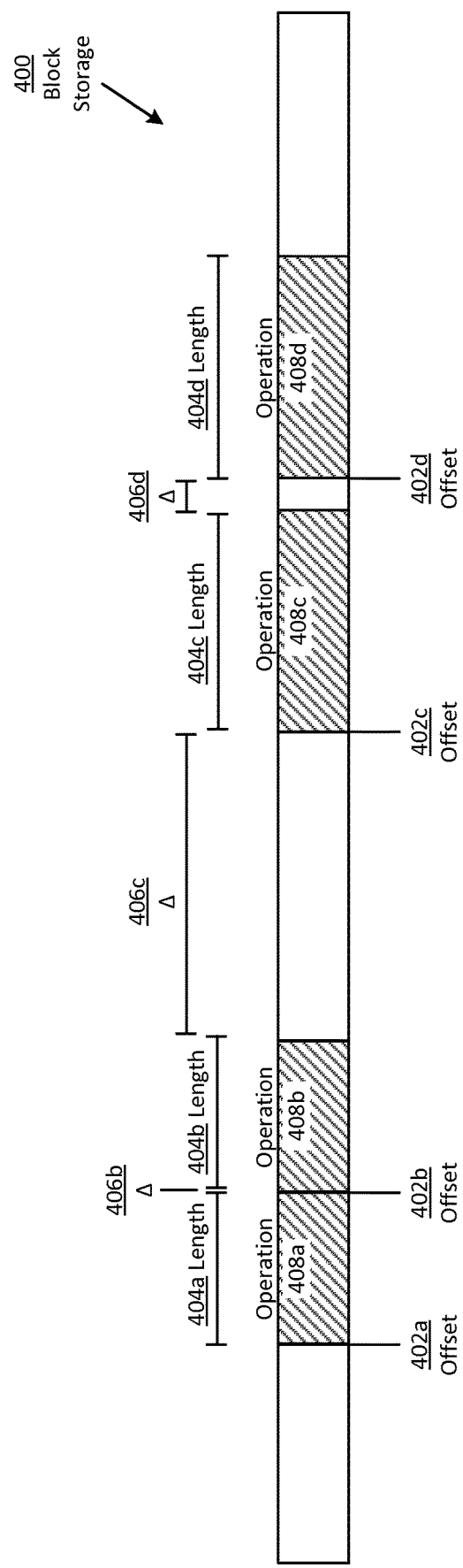
FIG. 4 depicts an example logical arrangement of a block storage device on which operations are performed, and deltas between those operations may be determined.

FIG. 4 depicts an example logical arrangement of a block storage device on which operations are performed, and deltas between those operations may be determined. This logical arrangement of a block storage device may be a logical arrangement of the blocks on block storage device 300 of FIG. 3, for example. The position of operations within a block storage device may be used to calculate, or measure, deltas between these operations—the difference between one operation's end point and the starting point of the next operation to be performed (or of one operation's starting point and a previous operation's end point). A delta may be based on a distance between these two points within a track, and may include moving between tracks on a block storage device, or other movements or distances that take time to move between. These deltas may then be used to determine whether (and/or to what degree) a sequence of read and write operations is classified as sequential or random. These deltas may be determined between two operations of any type—two read operations, two write operations, a read followed by a write, or a write followed by a read.

Block storage 400 in FIG. 4 is depicted as a logical arrangement of the blocks in a block storage device. For instance, using block storage device 300, a starting point may be selected for a track, and that track may be set out linearly. Then, an adjoining track may be set out linearly after that first track, and this may be repeated for all of the tracks on block storage device 300.

There are four adjacent operations depicted as being performed on block storage 400 of FIG. 4. The first operation 408a begins at offset 402a (a distance between the point at which the operation starts and a point selected as being the logical beginning point of block storage 400) and has a length 404a. The second operation 408b (which is adjacent to operation 408a) begins at offset 402b and has a length 404b. The third operation 408c (which is adjacent to operation 408b) has an offset 402c and has a length 404c. Finally, the fourth operation 408d (which is adjacent to operation 408d) has an offset 402d and a length 404d.

As depicted, these operations are performed from left to right—the first operation is performed, then the second operation, then the third operation, and finally the fourth operation. It may be appreciated that an order of operations does not need to proceed from smaller offsets to larger offsets. Operations may be performed on any valid offsets in any order.

Each operation has a delta relative to the operation that was performed immediately before it. Operation 408a is the first operation performed and it has no associated delta because it was the first operation performed so there is no operation that was performed immediately before it. Operation 408b is the second operation and it has a delta of zero (depicted as delta 406b). That is, there is no space between its starting point and operation 408a's end point—operation 408a's offset 402a plus its length 404a equals the offset 402b of operation 408b. In embodiments, operation 408b may generally be considered to be a sequential operation because it has no delta relative to its preceding operation—operation 408a.

Operation 408c does have a delta relative to its preceding operation (operation 408b), and this delta is depicted as delta 406c. For purposes of this illustration, operation 408c is likely to be considered a random operation relative to the preceding operations because its associated delta—delta 406c—is some threshold amount of time or distance larger than the other two deltas—deltas 406b and 406d.

The final delta depicted is delta 406d, which represents a delta for operation 408d relative to the prior operation—operation 408c. Delta 406d is depicted as being larger than delta 406b and smaller than delta 406c. Given that, delta 406c is generally more likely to be considered a sequential operation than operation 408c, but less likely to be considered a sequential operation than operation 408b.

Figure 5:
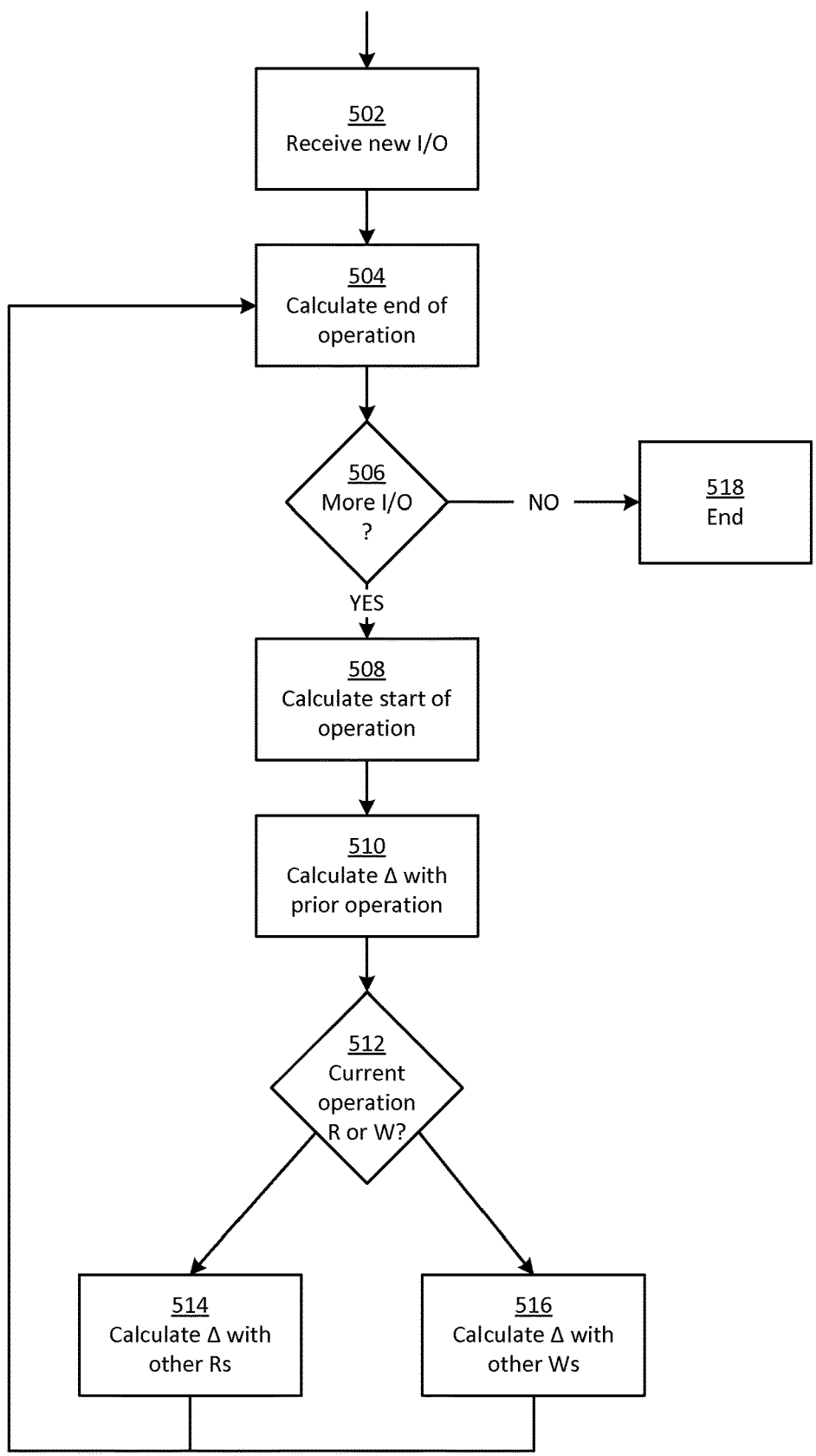
FIG. 5 depicts example operating procedures for determining the distribution of a sequence of operations to a block storage device among reads and writes and sequential and random operations.

Turning now to FIG. 5, FIG. 5 (and FIGS. 7-9) depicts example operating procedures for embodiments described herein. These operating procedures may be implemented in environment 100 of FIG. 1, or environment 200 of FIG. 2, for example. It may be appreciated that there are embodiments that do not implement each depicted operation, or which operations in a different order than is depicted.

FIG. 5 depicts example operating procedures for determining the distribution of a sequence of operations to a block storage device among reads and writes, and sequential and random operations. The operating procedures of FIG. 5 may be used to calculate deltas and/or latencies for a series of operations (like the deltas depicted in FIG. 4), and use these calculated deltas and/or latencies to determine to what degree operations are sequential or random. In embodiments, a sequence of operations may be determined to be either sequential or random. In other embodiments, a sequence of operations may be considered to have a degree of randomness (e.g., 40% random, and therefore 60% sequential). In other embodiments, a threshold amount of latency may be established, with operations that take longer than that threshold amount of time to implement being considered to be random and operations that take no more than that threshold amount of time to implement being considered to be sequential. Then, deltas of operations that are considered sequential and random, respectively, may be analyzed to determine a boundary of what is sequential versus what is random in terms of deltas.

The operating procedures of FIG. 5 may be implemented, for example, in the host partition or operating system of a physical host that executes an instance that issues the I/O commands (or directs those I/O commands to a block storage device) being measured.

The operating procedures of FIG. 5 may be used to analyze the read and write operations for a particular customer. Further, where a customer is a customer account that multiple users have access to (each user having his own user identifier), this analysis may be done on a per-user identifier basis. Additionally, where a customer has multiple volumes on one or more block storage devices, this analysis may be done on a per-volume basis.

The operating procedures of FIG. 5 begin with procedure 502, which depicts receiving new I/O operations (where input operations may be considered to be writing to a block storage device, and output operations may be considered to be reading from a block storage device). In embodiments, these may be the I/O operations that are sent to a block storage device, such as block storage device 300 of FIG. 3. In other embodiments, these may be the I/O operations of a specific customer account, or a specific user of that customer account. In other embodiments, these operations may be a synthetic workload where, rather than coming from a specific customer account as they are being made, they may be generated or created for the purpose of evaluating the system on which these operations are implemented. Where these are After procedure 502, the operating procedures of FIG. 5 move to procedure 504.

Procedure 504 depicts taking the first operation in the I/O sequence received in procedure 502, and calculating an endpoint for that first operation. In embodiments, an operation may be expressed as (1) an offset from a logical starting point of the block storage device (e.g., 32k bytes from the logical starting point, or 8 blocks from the logical starting point) and a length of the operation (e.g., for the next 4k bytes after that starting point, or for the next 2 blocks from that starting point). In these embodiments, the endpoint of the operation may then be the sum of the offset and the length for an operation (e.g., 32k bytes for an offset and 4k bytes for a length of the operation indicates an endpoint of 36k bytes from the logical starting point). In other embodiments where operations are expressed in a manner that is different than offset and length, the endpoint may be similarly calculated as the end of where the operation is performed on the block storage device. After procedure 504, the operating procedures of FIG. 5 move to procedure 506.

Procedure 506 depicts determining whether there are any additional operations in the sequence of I/O operations received in procedure 502. In embodiments, procedure 506 may include determining whether there are any additional operations stored in a queue of operations to perform on the block storage device. In other embodiments, procedure 506 may include determining whether a predetermined amount of time has occurred without receiving a new operation (e.g., 5 seconds). In other embodiments, procedure 506 may include determining whether a certain time period for analyzing operations has occurred (e.g., the operating procedures of FIG. 5 may run for 30 minutes). In embodiments, operations issued over a period of time are analyzed by the operating procedures of FIG. 5. In other embodiments, a subset of these issued operations is analyzed by the operating procedures of FIG. 5. This subset may be determined by sampling the issued operations, such as by randomly selecting some operations for additional analyzing, which not selecting other operations for additional analyzing.

If there are any additional operations in the sequence of I/O operations, the operating procedures move to procedure 508. If there are not any additional operations in the sequence of I/O operations, the operating procedures move to procedure 518, where the operating procedures of FIG. 5 end.

Procedure 508 depicts calculating a starting point of the next operation. As depicted, there is a sequence of I/O operations being received, and they are analyzed based on the current operation and the operation that preceded the current operation. Once the current operation has been evaluated, then the next operation becomes the current operation, the current operation becomes the previous operation, and the process is repeated. As described herein, procedure 508 concerns the next operation in that this is the next operation to evaluate after evaluating an operation in procedure 504.

Procedure 508 depicts calculating a starting point for this operation. As described above, with respect to procedure 504, an operation may be expressed as an offset and a length. In these embodiments, the starting point of the operation may be this offset. In other embodiments where an operation is expressed differently, the starting point of such an operation may be similarly determined to be the start of a portion of the block storage device that the operation is performed on. After procedure 508, the operating procedures of FIG. 5 move to procedure 510.

Procedure 510 depicts determining a delta between the starting point of the current operation as determined in procedure 508 and an ending point of the prior operation as determined in procedure 504. This may comprise determining deltas between adjacent pairs of operations (one delta being calculated for each adjacent pair, and a pair of operations may be considered to be one operation—using the end point of that one operation and the next operation within a sequence of operations—using the starting point of that next operation). In embodiments where the current operation's starting point is logically farther away from the logical origin of the block storage device than the prior operation's endpoint, determining this delta may involve taking the difference of this starting point and this endpoint. In embodiments where the current operation's starting point is logically closer to the logical origin of the block storage device than the prior operation's endpoint, determining this delta may involve taking the absolute value of the difference of this starting point and this endpoint.

In other embodiments, the particulars of a block storage device may be considered. For instance, where the block storage device is a magnetic disk with a read/write head, like block storage device 300 of FIG. 3, it takes time to move the read/write head between tracks. In embodiments like this, this access time may be used in determining the delta. For instance, each track that the read/write head must be moved may be assigned a value in bytes (so as to express the delta with one value—the distance in bytes between the endpoint of the previous operation and the starting point of the current operation). In other embodiments that use different types of block storage devices, the particulars of those block storage devices may be similarly considered in determining a delta.

In embodiments, procedure 510 includes determining a latency involved with performing the operation on the block storage device. This latency may be measured as the time between when the operation is issued to the block storage device and when it is performed by the block storage device. In other embodiments, this latency may be measured as the time between when the block storage device finishes performing the preceding operation and the time when the block storage device finishes performing this operation. This may be considered to be measuring a plurality of latencies associated with a block storage device performing read and write operations. After procedure 510, the operating procedures of FIG. 5 move to procedure 512.

Procedure 512 depicts determining whether the current operation is a read ("R") operation or a write ("W") operation. Embodiments distinguish between read operations and write operations—there are not just random operations and sequential operations, but random reads, random writes, sequential reads and sequential writes. In such embodiments, an operation may be determined to be a read or a write, so that the delta calculated in procedure 510 may be accounted for accordingly. In embodiments, the operation itself explicitly indicates whether it is a read or a write, or this information may be inferred from the operation (such as where a write operation includes the data to write and a read operation does not).

If the current operation is read operation, then the operating procedures move to procedure 514. If the current operation is a write operation, then the operating procedures move to procedure 516.

Procedure 514 depicts calculating the delta of the current operation as a delta for a read operation. In embodiments, only an average delta may be maintained. For example, a system may keep track of an average read delta, and the number of read deltas encountered. Then, when a new read delta is encountered, the new delta may be summed with the sum of all previous read deltas (determined by taking the product of the average read delta and the number of read deltas encountered), the number of read deltas encountered may be incremented by one, and the new average read delta may be determined as this sum of all read deltas divided by the new number of read deltas encountered.

In other embodiments, more data may be maintained. For instance, the value of each read delta may be maintained, along with the order in which the operation was processed, and/or a time at which the operation was processed. Where data such as this is maintained, statistics such as median and standard deviation may be determined for the read deltas. After procedure 514, the operating procedures move to procedure 504, where an endpoint for the operation is determined, and then procedure 506, where it is determined if there is more I/O to process. The latency that may have been calculated in procedure 510 may also be maintained.

Procedure 514 deals with a case where the operation is a read operation. If, instead, at procedure 512 it was determined that the operation is a write operation, the operating procedures move to procedure 516. Procedure 516 depicts calculating the delta of the current operation as a delta for a read operation. Procedure 516 may be implemented in a similar manner as procedure 514, where write deltas here are treated like read deltas are treated in procedure 514. After procedure 514, the operating procedures move to procedure 504, where an endpoint for the operation is determined, and then procedure 506, where it is determined if there is more I/O to process.

This loop involving operations 504 through 514/516 may be repeatedly run until it is determined in procedure 506 that there is no more I/O to process. At that point, the operating procedures move to procedure 518, where the operating procedures of FIG. 5 end.

Along with information about the deltas, additional information may be collected and stored. This additional information may include an indication of a size of a volume to which the operations are directed, an identifier for that volume, an identifier for the customer that issued the operations, a time at which the operations were issued or executed, a length of time over which the operations were issued, and a number of operations issued by the customer.

In embodiments, information about latencies and deltas may be used to determine a how operations are considered to be random or sequential. It may be that operations with associated latencies above a given threshold are considered to be random operations, and operations with associated latency below the given threshold are considered to be sequential operations. Then, these operations that are grouped as random (or sequential) may be analyzed for their respective deltas, and a correlation between deltas and latencies may be developed. This correlation between deltas and latencies, or this latency threshold may be used to generate a synthetic load. Given this association between latencies and whether operations are random or sequential, and latencies and deltas, future operations may be classified as being random or sequential based on deltas alone, without analyzing latencies. In embodiments, this analysis may be performed separately for the read operations and the write operations. In other embodiments, this analysis may be performed on operations without regard to whether they are read operations or write operations.

Figure 6:
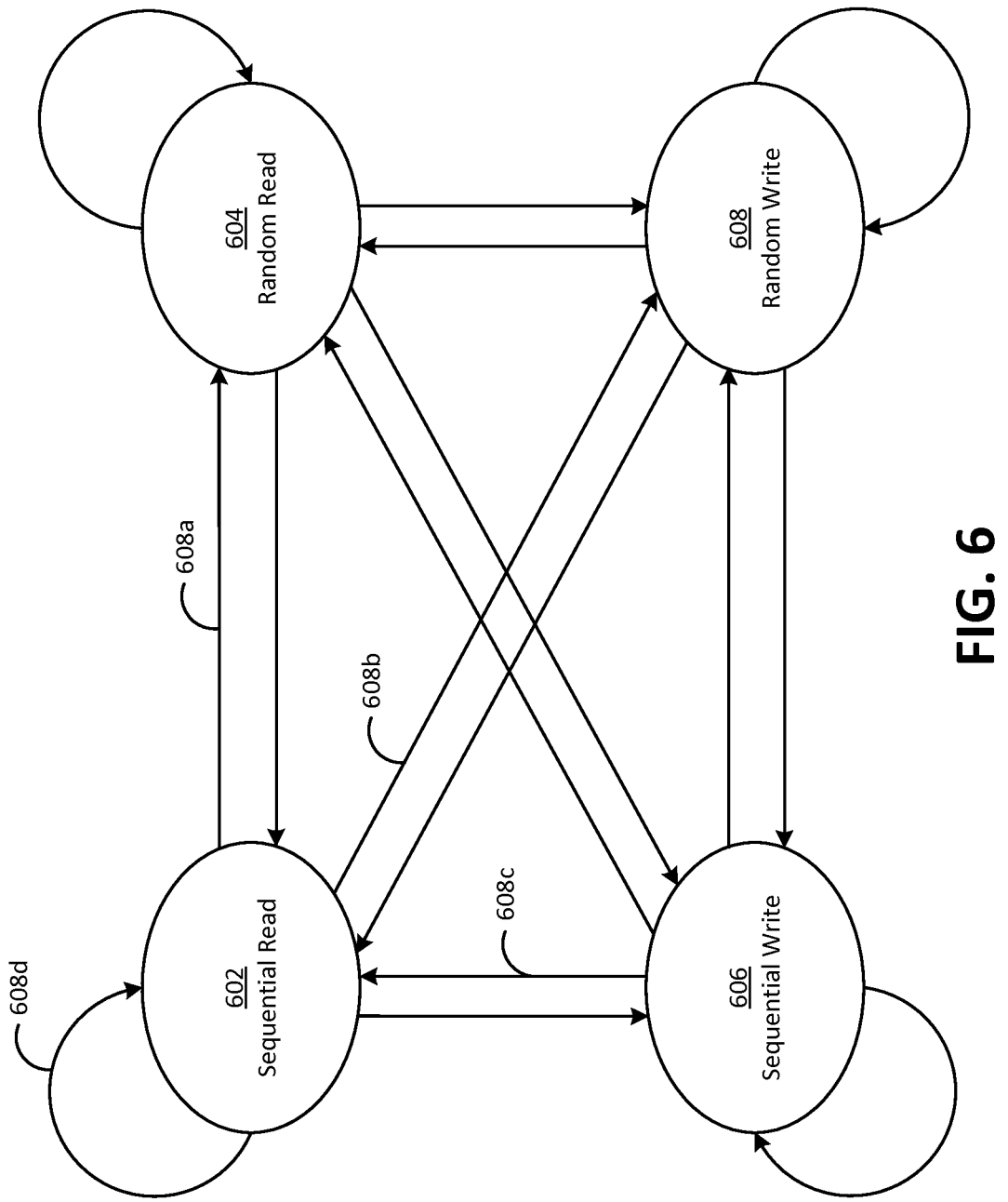
FIG. 6 depicts a state diagram that may be generated based on the distribution of the sequence of operations determined in FIG. 5.

FIG. 6 depicts a state diagram, or probability model, that may be generated based on the distribution of the sequence of operations determined in FIG. 5. This state diagram is a mathematical system that expresses these distributions and the probability that the distribution will transition from one type of operation to another (e.g., from a random read to a random write). It may be considered to be a Markov chain, and a fully connected one, at that, because each state may transition into every other state (including transitioning back on itself). In particular, this state diagram may be considered to be an embodiment of a discrete-time Markov chain. A discrete-time Markov chain represents mathematical systems that contain transitions between multiple states. The next state depends on the current state alone, and not on any previous state that has been encountered. Since the next state depends on the current state alone, the Markov chain may be considered to be memory-less.

The four states depicted indicate the four types of operations—sequential read 602, sequential write 604, random read 606, and random write 608. The transitions between these states are then represented with arrows between the states. All of the transitions from the sequential read 602 state have been labeled (a transition to random read 608*a*, a transition to random write 608*b*, a transition to sequential write 608*c*, and a transition back to sequential read 608*d*). For the sake of clarity, the transitions from the other three states are depicted, but not labeled.

The state diagram indicates what the probability is that a transition will be made from a certain state using only the current state as input. Since a new operation will cause a state transition (even another sequential read operation will cause a transition back on sequential read 608*d*), the probability that one of these state transitions will occur upon encountering a new operation is 100%. Since the probability that one of these state operations will occur upon encountering a new operation is 100%, the probabilities of each of the four transitions sums to 100%. For example, the probability of transitioning to a random read 608*a* may be 10%, the probability of transitioning to a random write 608*b* may be 20%, the probability of transitioning to a sequential write 608*c* may be 30%, and the probability of transitioning back to a sequential read 608*d* may be 40% (10%, 20%, 30%, and 40% summing to 100%).

It may be appreciated that there are embodiments that implement different state diagrams. For instance, the depicted state diagram bases the probability of a transition only upon the most recently encountered operation and the current operation. There may be embodiments that base the probability of a transition upon the two most recently encountered operations and the current operation. Then there would be 16 states: (1) sequential read/sequential read; (1) sequential read/sequential write; (3) sequential read/random read; (4) sequential read/random write; (5) sequential write/sequential read; (6) sequential write/sequential write; (7) sequential write/random read; (8) sequential write/random write; (9) random read/sequential read; (10) random read/sequential write; (11) random read/random read; (12) random read/random write; (13) random write/sequential read; (14) random write/sequential write; (15) random write/random read; and (16) random write/random write.

Such a state diagram would not be fully connected, because not every state can transition into every other state. For instance, the sequential read/sequential write state can only transition into a state where the operation two operations in the past was a sequential write (since the diagram is currently in a state where the most recent operation in the past was a sequential write): (1) sequential write/sequential read; (2) sequential write/sequential write; (3) sequential write/random read; and (4) sequential write/random write. Nonetheless, the probability of the transitions out of any state would still sum to 100%.

Figure 7:
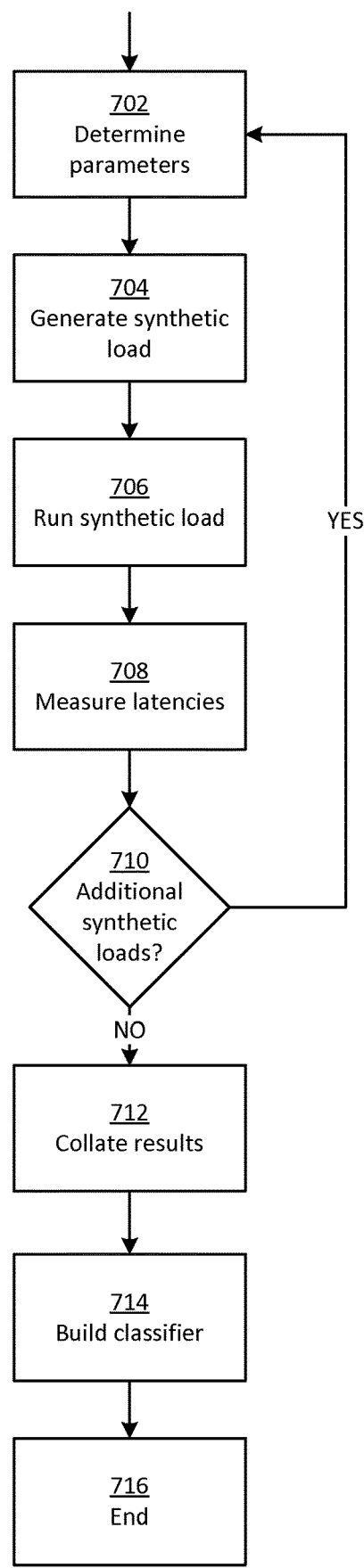
FIG. 7 depicts example operating procedures for determining a relationship between workloads and latencies in operations performed on a block storage device.

FIG. 7 depicts example operating procedures for determining a relationship between workloads and latencies in operations performed on a block storage device.

Procedure 702 depicts determining parameters for a synthetic workload. As opposed to a workload received from an entity or customer, a synthetic workload may be created based on parameters, where the synthetic workload may have read operations or write operations similar to the operations received from the entity. For instance, the probability model of FIG. 6 may be used to create a synthetic workload.

These determined parameters may include, for example, a rate of random reads, a rate of random writes, a rate of sequential reads, and a rate of sequential writes to produce within a synthetic I/O load. The parameters may also include, for example, a distribution of times to wait between operations (or within operations of different types, such as one distribution of times to wait between random reads and other random reads, and another distribution of times to wait between random reads and sequential reads). These parameters may also include a total number of read and write operations of the synthetic workload, a distribution of read and write operations. (including a distribution of sequential read, random read, sequential write, and random write operations). These parameters may be received as a result of user input to a user interface that accepts data that defines the parameters. Where multiple loops of operations 702-710 are performed to generate multiple synthetic workloads, the parameters may be varied among these multiple synthetic workloads. In other embodiments, the parameters may be specified in one or more stored files that may be read in procedure 702.

In other embodiments, the parameters may capture the state transitions as depicted in FIG. 6. This may be where the probability that a particular operation occurs depends on the operation that precedes it. For instance, sequential reads may be generally grouped together in real-world scenarios—a typical operation may involve an entity writing a large amount of data in a sequential or near-sequential fashion. In such scenarios, a sequential read may be more likely to follow another sequential read than to follow a random read, and the parameters in procedure 702 may reflect this. After procedure 702, the operating procedures of FIG. 7 move to procedure 704.

Procedure 704 depicts generating a synthetic workload based on the parameters determined in procedure 702. For instance where the parameters determined in procedure 702 specify a probability that each I/O operation may occur given the prior operation, procedure 704 may comprise using a random number generator that ranges over the sum of these probabilities. The generated random number may then indicate which operation comes next. For instance, where a random number produces an output between 1 and 100, inclusive, each of these output integers may indicate a particular operation (where random reads occurring have a 10% probability, an output between 1 and 10 inclusive may indicate a random read).

Operations may be produced for as long as is specified in the parameters. For instance, the parameters may specify an amount of time to produce the synthetic workload, or a number of operations to produce in the synthetic workload. After procedure 704, the operating procedures of FIG. 7 move to procedure 706.

Procedure 706 depicts running the synthetic workload generated in procedure 704. This may comprise sending the operations specified in the synthetic workload to one or more block storage devices that are being evaluated under the synthetic workload, such as by issuing read and write operations to a block storage device. After procedure 706, the operating procedures of FIG. 7 move to procedure 708.

Procedure 708 depicts measuring latencies associated with running the synthetic workload in procedure 708. These latencies may comprise a different latency for each operation—the time between when an operation is issued to a block storage device and when the block storage device carries out the operation. In the case of a read, the time when the block storage device carries out the operation may be when the read data is returned to the system that issues the operation to the block storage device. In the case of a write, when the block storage device carries out the operation may comprise when the block storage device issues an acknowledgement to the system that it has carried out the operation.

In other embodiments, the latencies measured in procedure 708 may involve a total latency or average latency associated with performing the operations specified in the synthetic workload. After procedure 708, the operating procedures of FIG. 7 move to procedure 710.

Procedure 710 depicts determining whether there are additional synthetic workloads to run. It may be that multiple synthetic workloads are run so that no single synthetic workload produces abnormal results that are not truly representative of the parameters. For example, parameters that specify that a synthetic workload has a 25% probability of each operation being a random read may nonetheless, in rare circumstances, produce a synthetic workload that is entirely random read operations. Running a synthetic workload that is entirely random reads may exist based on these parameters, but may still be un-indicative of typical synthetic workloads based on these parameters. Running multiple synthetic workloads may avoid this consideration.

If there are additional synthetic workloads to run, the operating procedures of FIG. 7 return to procedure 702, where the parameters of the next synthetic workload are determined. In embodiments, the parameters for each synthetic workload may be the same. If there are no additional synthetic workloads to run, the operating procedures of FIG. 7 move to procedure 712.

Procedure 712 depicts collating, or aggregating, the results of running the synthetic workloads. Where only one synthetic workload is performed, procedure 712 may be omitted. Where multiple synthetic workloads are run, procedure 712 may involve collecting the results together, such as collecting the results of the synthetic workload calculated in the previous operations along with a different synthetic workload. For instance, where running a synthetic workload results in determining a single latency value, each of these single latency values for each synthetic workload may be aggregated into a distribution (that measures, e.g., standard deviation, mean, median mode). Where multiple latency values may be determined for each synthetic workload, these multiple latency values may similarly be aggregated into a distribution. These latency values may be stored along with their corresponding parameters or workload, for use in the operating procedures of FIGS. 8-9. After procedure 712, the operating procedures of FIG. 7 move to procedure 714.

Procedure 714 depicts building a classifier based on the collated results of procedure 712. A workload classifier may take a workload as input and generate a probability distribution of the workload over latencies (as described with respect to FIG. 8). In other embodiments, a latency classifier may take latencies as inputs and generate a probability distribution of the latency over workloads (as described with respect to FIG. 9). The workload classifier and the latency classifier may be logical inversions of the other—where one takes a workload as input, the other produces an output in terms of workload, and where one takes a latency as input, the other produces an output in terms of latency. Additionally, these probabilities may be expressed in conditional probability notation as P(workload|latency) and P(latency|workload), respectively. These probability distributions may represent the probability that a given input will produce a given output (e.g., the probability that a given input workload will, when run on a block storage device, result in any of several latencies). The classifier may be generated using a machine-learning process, such as a decision tree. After procedure 714, the operating procedures of FIG. 7 move to procedure 716, where the operating procedures of FIG. 7 end.

These measured latencies may be used to set prices for customers. For instance, a customer may be charged based on the number of input and output operations that it issues to a block storage device. Where the latency associated with random and sequential operations is known, this pricing information may be further refined. For instance, a charge associated with performing random operations may be less than a charge associated with performing sequential operations.

Additionally, these measured latencies may be used for placement of customer volumes among a plurality of block storage devices. For instance, a block storage device may be able to handle a greater throughput of sequential operations than random operations, so knowing what type of operations a customer is expected to issue (or expected to issue to a particular volume) may aid in handling placement. Likewise, certain customers may have similar characteristics, and so information about one customer may be used to place another customer's volumes. For instance, these similar characteristics may be that the two customers have a volume of a similar size, that they are both geographically located in a similar place, or that they both execute instances in the same or a similar datacenter or region.

Figure 8:
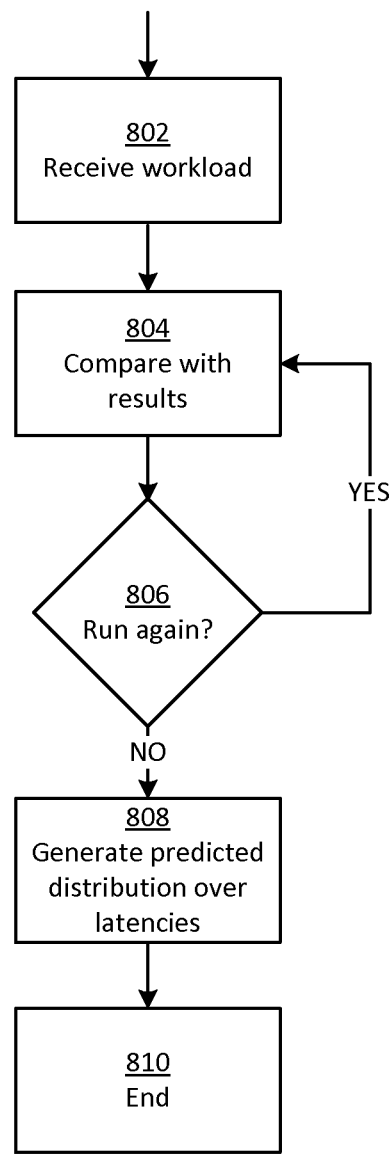
FIG. 8 depicts example operating procedures for using the relationship determined in FIG. 7 to generate a predicted distribution of latencies given an input workload.

FIG. 8 depicts example operating procedures for using a classifier determined in FIG. 7 to generate a predicted distribution of latencies given an input workload. The operating procedures of FIG. 8 may be implemented by a workload classifier as described with respect to FIG. 7. The operating procedures of FIG. 8 may be considered to be deal with similar matters as the operating procedures of FIG. 9. The operating procedures of FIG. 8 involve taking a workload as input and producing a predicted distribution of latencies for that workload. The operating procedures of FIG. 9 switch the input and output types—the operating procedures of FIG. 9 involve taking latencies as input and producing a predicting distribution of workloads for those latencies.

Procedure 802 depicts receiving a workload. This may comprise a synthetic workload or an actual workload produced by a customer, and may be expressed in a similar manner as the synthetic workload of procedure 704 of FIG. 7. After procedure 802, the operating procedures move to procedure 804.

Procedure 804 depicts comparing the workload with results of running similar synthetic workloads in FIG. 7. For example, probabilities for each of the four operations may be determined for the workload from procedure 802, and an exact, or closest, match may be made among the probabilities for each of the four operations in the synthetic workloads run in the operating procedures of FIG. 7. From this comparison, an example latency or latencies may be assigned for the workload based on the similar synthetic workload run in the operating procedures of FIG. 7. After procedure 804, the operating procedures move to procedure 806.

Procedure 806 depicts determining whether to run the workload again. For example, the workload may be run multiple times so that no single valid, but rarely-encountered, latency value is taken as being representative of the latency involved with running this workload. If, in procedure 806, it is determined to run the workload again, the operating procedures of FIG. 8 move to procedure 806, move back to procedure 804. Loops of procedure 804 and 806 may be run for the desired number of times to run the workload. If, in procedure 806, it is determined to not run the workload again, the operating procedures of FIG. 8 move to procedure 808.

Procedure 808 depicts generating a predicted distribution of latencies for the workload. Procedure 808 may comprise generating the predicted distribution where multiple loops of procedures 804 and 806 are run, using the latencies determined in procedure 804. After procedure 808, the operating procedures move to procedure 810, where the operating procedures of FIG. 8 end.

Figure 9:
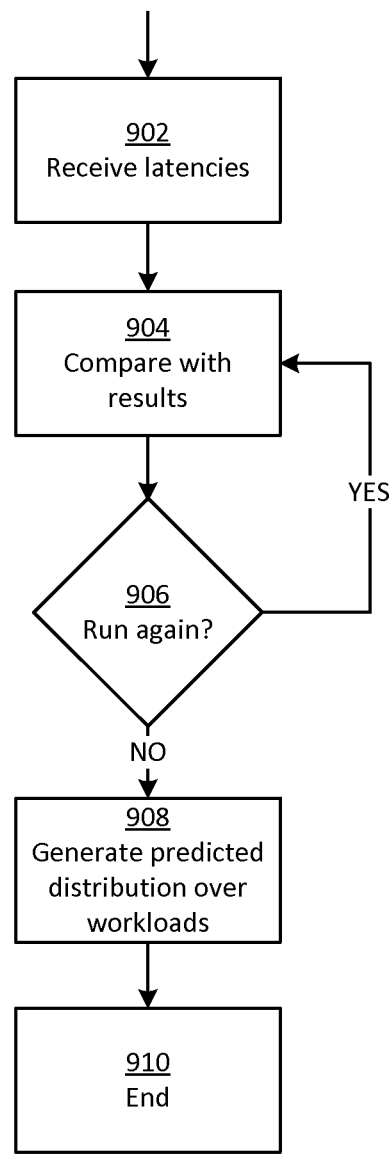
FIG. 9 depicts example operating procedures for using the relationship determined in FIG. 7 to generate a predicted distribution of workloads given an input set of latencies.

FIG. 9 depicts example operating procedures for using a classifier determined in FIG. 7 to generate a predicted distribution of workloads given an input set of latencies. The operating procedures of FIG. 8 may be implemented by a latency classifier as described with respect to FIG. 7. As described above, these operating procedures are similar to those of FIG. 8, where the input and output types are switched.

Procedure 902 depicts receiving latencies. These received latencies may indicate how much time it takes for a block storage device to perform a given workload. In embodiments, these latencies may be expressed as a single total time, and may be stored in a file, or determined based on user input received in a user interface. After procedure 902, the operating procedures move to procedure 904.

Procedure 904 depicts comparing the example latencies with results of running similar synthetic workloads in FIG. 7. This operation may be performed similar to performing procedure 804 of FIG. 8, save for using latencies to find close matches with the latencies of synthetic workloads, and determining a synthetic workload based on these matches, rather than using workloads to find close matches with synthetic workloads and determining latencies based on these matches. After procedure 904, the operating procedures move to procedure 906.

Procedure 906 depicts determining whether to run the latencies again. For example, the latencies may be run multiple times so that no single valid, but rarely-encountered, workload is taken as being representative of a workload that produces these latencies. If, in procedure 906, it is determined to run the latencies again, the operating procedures of FIG. 9 move to procedure 906, move back to procedure 904. Loops of procedure 904 and 906 may be run for the desired number of times to run the latencies. If, in procedure 906, it is determined to run the latencies again, the operating procedures of FIG. 9 move to procedure 906 move back to procedure 904. Loops of procedure 904 and 906 may be run for the desired number of times to run the latencies. If, in procedure 906, it is determined to not run the latencies again, the operating procedures of FIG. 9 move to procedure 908.

Procedure 908 depicts generating a predicted distribution of the latencies over workloads. Procedure 908 may comprise generating the predicted distribution where multiple loops of procedures 904 and 906 are run, using the workloads determined in procedure 904. After procedure 908, the operating procedures move to procedure 910, where the operating procedures of FIG. 9 end.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. Such systems may comprise at least one memory that bears instructions that, upon execution by at least one processor, cause the system perform effectuate certain results as described herein.

Most embodiments utilize at least one network that would be familiar to those skilled in the art for supporting communications using any of a variety of commercially-available protocols, such as TCP/IP (transmission control protocol/internet protocol), OSI (open systems interconnection), FTP (file transfer protocol), UPnP (universal plug and play), NFS (network file system), CIFS (common internet file system) and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a non-transitory computer-readable medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It may be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to non-transitory, volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the embodiments as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It may be understood, however, that there is no intention to limit the embodiments to the specific form or forms disclosed, but on the contrary, the intention is to cover all modifications, alternative constructions and equivalents falling within the spirit and scope of the embodiments, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the embodiments unless otherwise claimed. No language in the specification should be construed as indicating any non-claimed element as essential to the practice of the embodiments.

Preferred embodiments of this disclosure are described herein, including the best mode known to the inventors for carrying out the embodiments. Variations of those preferred embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this embodiments includes all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method for determining performance associated with running workloads on a block storage device, comprising:
   issuing, to the block storage device, a plurality of operations of a plurality of workloads, wherein the plurality of operations comprise read operations and write operations;
   measuring a latency associated with the block storage device performing the operations of each of the plurality of workloads;
   aggregating at least two latencies of the latencies for each of the plurality of workloads;
   creating a workload classifier with a machine-learning process based at least in part on the plurality of workloads and the at least two latencies; and
   determining, by the workload classifier, a probability distribution of latencies for an input workload on the block storage device.

2. The method of claim 1, further comprising:
   creating a latency classifier with the machine-learning process or another-machine learning process based at least in part on the plurality of workloads and the at least two latencies; and
   determining, by the latency classifier, a probability distribution of workloads for an input latency.

3. The method of claim 1, further comprising:
   generating at least one workload of the plurality of workloads based at least in part on a plurality of deltas for a plurality of adjacent pairs of operations in a plurality of operations received from an entity, each delta being based at least in part on an end point of one operation and a starting point of a subsequent operation in the plurality of operations.

4. A system for determining performance associated with running workloads on a block storage device, comprising:
   at least one memory bearing instructions that, upon execution, cause the system at least to:
      issue, to the block storage device, a plurality of operations of a plurality of workloads, wherein the plurality of operations comprise read operations and write operations;
      measure a latency associated with the block storage device performing the operations of each of the plurality of workloads;
      create a first classifier based at least in part on the plurality of workloads and the latency for each of the plurality of workloads; and
      determine, with the first classifier, a probability distribution of workloads for an input latency.

5. The system of claim 4, wherein the at least one memory further bears instructions that, upon execution, cause the system at least to:
   create a second classifier based at least in part on the plurality of workloads and the latency for each of the plurality of workloads; and
   determine, with the second classifier, a probability distribution of latencies for an input workload.

6. The system of claim 4, wherein the read operations comprise at least one sequential read operation and at least one random read operation, and wherein the write operations comprise at least one sequential write operation and at least one random write operation.

7. The system of claim 4, wherein the at least one memory further bears instructions that, upon execution, cause the system at least to:
   generating at least one workload of the plurality of workloads based at least in part on a total number of read and write operations of the at least one workload, or a distribution of read and write operations within the at least one workload.

8. The system of claim 4, wherein the distribution of read and write operations comprises a distribution of sequential read, random read, sequential write, and random write operations.

9. The system of claim 4, wherein the plurality of workloads comprises at least one sequential operation that comprises an operation that has a location on a block storage device within a threshold distance from an operation that immediately precedes it, and wherein the plurality of workloads comprises at least one random operation that comprises an operation that has a location on a block storage device greater than the threshold distance from the operation that immediately precedes it.

10. The system of claim 4, wherein the instructions that, upon execution, cause the system at least to create the first classifier further cause the system at least to:
create the first classifier using a machine-learning process.

11. A non-transitory computer-readable medium, bearing computer-readable instructions that, upon execution on a computing node, cause the computing node to perform operations comprising:
issuing, to a block storage device, a plurality of operations of a plurality of workloads, wherein the plurality of operations comprise read operations and write operations;
measuring a latency associated with the block storage device performing the operations of each of the plurality of workloads;
creating a first classifier based at least in part on the plurality of workloads and the latency for each of the plurality of workloads; and
determining, from the first classifier, a probability distribution of latencies for an input workload.

12. The non-transitory computer-readable medium of claim 11, further bearing computer-readable instructions that, upon execution on the computing node, cause the computing node to perform operations comprising:
creating a second classifier based at least in part on the plurality of workloads and the latency for each of the plurality of workloads; and
determining, with the second classifier, a probability distribution of workloads for an input latency.

13. The non-transitory computer-readable medium of claim 12, wherein the workloads for an input latency indicates a probability that the input latency will be associated with a given workload associated with the block storage device performing operations of the given workload.

14. The non-transitory computer-readable medium of claim 11, wherein the probability distribution of latencies for an input workload indicates a probability that issuing a plurality of operations of the input workload to the block storage device will be associated with a given latency associated with the block storage device performing the operations of the input workload.

15. The non-transitory computer-readable medium of claim 11, further bearing computer-readable instructions that, upon execution on the computing node, cause the computing node to perform operations comprising:
generating at least one workload of the plurality of workloads based at least in part on a total number of read and write operations of the at least one workload.

16. The non-transitory computer-readable medium of claim 11, further bearing computer-readable instructions that, upon execution on the computing node, cause the computing node to perform operations comprising:
generating at least one workload of the plurality of workloads based at least in part on a distribution of read and write operations within the at least one workload.

17. The non-transitory computer-readable medium of claim 11, further bearing computer-readable instructions that, upon execution on the computing node, cause the computing node to perform operations comprising:
generating at least one workload of the plurality of workloads based at least in part on a distribution of sequential read, random read, sequential write, and random write operations.

18. The non-transitory computer-readable medium of claim 11, further bearing computer-readable instructions that, upon execution on the computing node, cause the computing node to perform operations comprising:
generating at least one workload of the plurality of workloads based at least in part on a measured rate of sequential read, random read, sequential write, and random write operations issued by an entity to the block storage device or another block storage device.

19. The non-transitory computer-readable medium of claim 11, further bearing computer-readable instructions that, upon execution on the computing node, cause the computing node to perform operations comprising:
measuring a rate of sequential read operations and a rate of random read operations issued by an entity to the block storage device or another block storage device based at least in part on determining that a first read operation is a sequential read operation or a random read operation based at least in part on a size of the first read operation, a location of the first read operation on the block storage device, and a location of a preceding read or write operation issued to the block storage device; and
generating at least one workload of the plurality of workloads based at least in part on the rate of sequential read operations and the rate of sequential write operations.

20. The non-transitory computer-readable medium of claim 19, wherein a location of the first read operation on the block storage device is a starting point for the first read operation, and a location of the preceding read or write operation issued by the entity to the block storage device is an ending point for a preceding read or write operation.

21. The non-transitory computer-readable medium of claim 11, wherein creating the first classifier comprises using a machine-learning process.

* * * * *